(12) United States Patent
Lampotang et al.

(10) Patent No.: US 7,128,578 B2
(45) Date of Patent: Oct. 31, 2006

(54) INTERACTIVE SIMULATION OF A PNEUMATIC SYSTEM

(75) Inventors: Samsun Lampotang, Gainesville, FL (US); David Erik Lizdas, Gainesville, FL (US); Edwin Boediono Liem, Louisville, KY (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 561 days.

(21) Appl. No.: 10/447,379

(22) Filed: May 29, 2003

(65) Prior Publication Data

US 2003/0233049 A1 Dec. 18, 2003

Related U.S. Application Data

(60) Provisional application No. 60/384,040, filed on May 29, 2002.

(51) Int. Cl.
*G09B 25/00* (2006.01)
(52) U.S. Cl. .................. 434/365; 434/307 R; 434/262; 128/204.23; 600/529
(58) Field of Classification Search ............... 434/118, 434/219, 262, 307 R, 308, 365; 128/204.21, 128/204.23, 205.11; 600/529, 532; 376/245
See application file for complete search history.

(56) References Cited

U.S. PATENT DOCUMENTS

| | | | | |
|---|---|---|---|---|
| 4,828,787 A | * | 5/1989 | Distler et al. ............... 376/245 |
| 4,964,804 A | * | 10/1990 | Carr et al. .................. 434/219 |
| 5,299,568 A | * | 4/1994 | Forare et al. .......... 128/205.11 |
| 5,931,160 A | * | 8/1999 | Gilmore et al. ........ 128/204.21 |
| 6,000,396 A | * | 12/1999 | Melker et al. ......... 128/204.21 |
| 6,158,432 A | * | 12/2000 | Biondi et al. .......... 128/204.21 |
| 6,321,748 B1 | * | 11/2001 | O'Mahoney ........... 128/204.21 |
| 6,390,091 B1 | * | 5/2002 | Banner et al. ......... 128/204.21 |
| 6,450,818 B1 | * | 9/2002 | Ogawa et al. ............... 434/118 |
| 6,463,930 B1 | * | 10/2002 | Biondi et al. .......... 128/204.21 |
| 6,656,127 B1 | * | 12/2003 | Ben-Oren et al. .......... 600/532 |
| 6,969,357 B1 | * | 11/2005 | Colman et al. ............. 600/529 |
| 2005/0098178 A1 | * | 5/2005 | Banner et al. ......... 128/204.23 |

\* cited by examiner

*Primary Examiner*—Joe H. Cheng
(74) *Attorney, Agent, or Firm*—Akerman Senterfitt

(57) ABSTRACT

A method, system and apparatus for simulating a pneumatic system. The method can include dividing a pneumatic system into logical component sections. Each of the logical component sections can be visually rendered in a graphical user interface. Also, user modification of control element settings in the logical component sections can be permitted. Subsequently, gas flows within the logical component sections can be animated using individually rendered gas molecule icons coupled to corresponding animation scripts. Each of the scripts can determine an animation direction and animation rate for a corresponding one of the gas molecule icons. In particular, the actual pneumatic system can be an anesthesia machine.

33 Claims, 7 Drawing Sheets

INTERACTIVE SIMULATION OF A PNEUMATIC SYSTEM

CROSS-REFERENCE TO RELATED APPLICATIONS

Pursuant to 35 U.S.C. § 119(e), this patent application is a continuation-in-part of U.S. Provisional Patent Application No. 60/384,040, filed on May 29, 2002, the contents of which are incorporated herein by reference.

BACKGROUND OF THE INVENTION

1. Statement of the Technical Field

The present invention relates to computerized simulation systems. More specifically, the invention relates to a method, system and apparatus for the interactive real-time simulation of a pneumatic system.

2. Description of the Related Art

Medical instruments range from the venerable scalpel to ultra-complex imaging systems. Each medical instrument includes an inherent utility in the field of health care diagnostics and medical treatment. A century ago, diagnostic tools barely existed, while treatment tools were restricted to purely mechanical devices. The study of control systems gave rise in the mid twentieth century to more complex diagnostic and treatment tools in which the electronic and manual operation of valves and switches permitted the selective application of forces about the patient. Examples range from the application of an electric current upon the patient to the anesthetization of a patient through the mechanical mixture of select gases in a mechanical anesthesia machine.

The advent of high performance computing in the latter portion of the twentieth century produced a vast range of new and exciting control systems, particularly for use within health care diagnostic and treatment instrumentation. Examples include electronic control systems for medication delivery, anesthesia ventilation, defibrillation and medical imaging. In the prototypical electronic control system for use with a health care instrument, an embedded computer program can manage the operation of the treatment or diagnostic tool while permitting computer human interaction through a visual interface, for instance a graphical user interface (GUI). Within the GUI, a multiplicity of virtual controls, including graphical knobs, sliders, switches and buttons, can be displayed for use by the end user in operating the instrument. As it will be recognized by the skilled artisan, however, both the operation of the instrument, and particular the use of the GUI can be extraordinarily complex. Yet, the extraordinary complexity of modern electronic control systems can produce an unacceptable risk of human error in the operation of the instrument.

Accordingly, with the increasing complexity of medical devices and their associated electronic control systems, there is an attendant need to provide increasingly sophisticated training techniques through which medical personnel can learn to use such complex health care instrumentation without jeopardizing the health of a patient. While classroom instruction and instruction manuals relating to the operation of complex medical instruments can offer important training, classroom instruction and written materials alone have proven to be no substitute for direct interaction with the instrument. Moreover, it is well known that clinicians often lack either or both the free time and the motivation to read an instrument manual or to attend a class directed to the use of a medical instrument. Consequently, simulation technologies have become an alternative in the training of clinicians in the use of complex medical technologies.

Simulation technologies allow the clinician to rapidly become subsumed in the initial process of becoming familiarized with a new medical instrument. The initial process can be quite stressful and often can involve trial and error manipulation of instrument controls while observing the resulting effect of the manipulation. While such trial and error experimentation is not possible with an actual device and actual patient, the simulation allows the user to experiment with many different scenarios without placing a patient at risk. Thus, the clinician can obtain a substantially better understanding of the operation of the instrument, which ultimately can benefit patient care and safety.

The anesthesia machine as a pneumatic system is perhaps one of the most complex medical instruments and requires significant training in its operation. Notably, there is little room for error in the actual usage of an anesthesia machine. Yet, the mechanical aspects of the anesthesia machine, a "familiar" piece of equipment used daily by anesthesiologists, remains somewhat of a mystery for some clinicians. Specifically, how the modification of individual control settings of an anesthesia machine can affect internal gas flow within different plumbing sections of the anesthesia machine can be sometimes difficult to grasp.

The difficulty in understanding the operation of an anesthesia machine, as would be the case with any pneumatic system, can be understood when considering the opaque nature of the internal plumbing lines of the anesthesia machine and the transparent nature of the various gases flowing through the plumbing lines. Hence, the flow of gases within the anesthesia machine cannot be traced through the anesthesia machine during the course of operation. Furthermore, in situations where more than one gas is present within the plumbing lines of the anesthesia machine, it can be conceptually difficult to track the flow of the different species of gas within the pneumatic circuit. The challenge, therefore, is to construct a mental model of the anesthesia machine that is accurate, enhances understanding and is readily accessible.

The computerized simulation of varying types of medical instrument systems have been developed. Generally, computerized simulations involve complex computer software executing within a workstation. Complicated, albeit accurate mathematical models drive the visual simulation of the operation of the system responsive to various control settings imposed by the operator. Typically, the graphical state of the GUI in the pneumatic system can be directly coupled to the output of the mathematical model governing the flow of gas throughout the plumbing lines of the system. Accordingly, the computing resource requirements to operate such as system can be substantial and the performance thereof can be more tightly linked to the processing capabilities of the workstation.

Most importantly, the instrument display itself can be limited by the size of the workstation display. More particularly, the typical workstation display can be limited in size, resolution and dimensionality. Accordingly, excepting for the most basic of instruments, when trying to present each element and feature of a pneumatic circuit in one display screen, so that an end user can view a global picture of the instrument plumbing, the pneumatic equipment layout generally will occupy the entire computer display. Yet, to properly simulate the operation of a pneumatic system, a bevy of instrument controls also must be presented through the GUI so that the end user can operate the controls of the instrument while observing the operation of the instrument in the pneumatic circuit. In particular, it can be important for the practitioner to observe the impact of a control adjustment within the pneumatic circuit.

It will be recognized by the skilled artisan, then, that if the presentation of the pneumatic circuit in the display consumes the entirety of the display, there will be little if any room to concurrently present the instrument controls in the display. Moreover, because most computer displays predominantly present images in two dimensions, the instrument controls often are presented as mere icons which can be difficult to recognize for the ordinary clinician. Finally, most conventional instrument simulations involve considerably substantial processing of gas flows resulting from the multiple permutations of control settings applied by the end user. In particular, the display animations resulting from changes in the underlying mathematical model can require significant program logic. As a result, the program size of the simulation can be prohibitively large which can inhibit the real-time distribution of the simulation over a computer communications network.

SUMMARY OF THE INVENTION

The present invention is a method, system and apparatus for simulating a pneumatic system which overcomes the deficiencies common among conventional instrument simulation systems and methods. As used herein, the term pneumatic system can refer to any system in which plumbing conduits host the flow of gases and other fluids therethrough. Particular examples in within the field of medicine can include an anesthesia machine, an ICU ventilator and the like, though the simplest of pneumatic machines can include a mechanical ventilator.

In accordance with the inventive arrangements, a pneumatic system can be divided into logical component sections. Each of the logical component sections can be visually rendered in a graphical user interface. Also, user modification of control element settings in the logical component sections can be permitted. Subsequently, gas flows within the logical component sections can be animated by rendering individual gas molecule images in the component sections. Each individual gas molecule image can be coupled to, or instantiated visually by, computer-readable code comprising an animation logic script for directing, or otherwise causing, not only the direction of the visual animation of the gas molecule image, but also the rate at which the gas molecule is animated within the logical component sections. As will be readily understood by one of ordinary skill in the art, an animation logic script can comprise a set of computer-implemented commands for performing a desired function. In the context of the present invention, as described, the animation logic scripts effect visual renderings of simulated movements of the animated gas molecule in a direction and/or at a rate, both the direction and/or rate prescribed by the logic script. The direction and/or rate, accordingly, can be dictated by the particular logic script, by a mathematical model, or a combination thereof.

An interactive real-time simulator can be provided in accordance with the present invention. More particularly, an interactive simulator configured to simulate a pneumatic system can include both a user interface configured for establishing ventilation modes and settings for the pneumatic system, and a pneumatic machine display configured to present a dynamically determined animated illustration of the pneumatic system. Significantly, each of the user interface and the pneumatic machine display can be disposed in separate views in which only one of separate views is displayed at any one time. In this regard, each of the user interface and the pneumatic machine display can include a toggle element which when activated can toggle a display of each separate view.

In a notable embodiment of the invention, the pneumatic machine can be an anesthesia machine. In this regard, the pneumatic display can be a display of an anesthesia machine formed of a collection of iconic elements. The iconic elements can be logically grouped into the following groupings: a breathing circuit, a low pressure gas distribution system, a high pressure gas distribution system, a mechanical ventilator and a scavenging system. Additionally, the logical groupings can include a manual ventilation subsystem having an activatable iconic representation of a breathing bag and adjustable pressure release valve (APL). When activated through the anesthesia machine display, the breathing bag representation can simulate a physical squeezing of the breathing bag.

Finally, the simulator can include a flow model communicatively linked to the ventilation animation logic and cross-coupled to a lung compliance and resistance model. The lung compliance and resistance model can provide gas pressure data to the flow model and the user interface in response to gas volume data produced in the flow model. The flow model, by comparison, can dynamically produce the gas flow data for the pneumatic machine animation logic in response to the gas pressure data provided by the lung compliance and resistance model, and ventilation modes and settings provided through the user interface. The lung compliance and resistance model translates lung volume into lung pressure using data from the flowmodel and an equation.

In a preferred aspect of the invention, an animation logic script can be coupled to individual gas molecule images in the pneumatic machine display. The animation logic script can dictate both a direction and a rate of animation for the coupled image. Importantly, the individual gas molecule images can include multiple different gas icons representative of gas present in portions of the pneumatic system. In particular, each of the different gas icons can represent a different type of gas and accordingly, each can have a distinguishing characteristic. For example, the distinguishing characteristic can include a different color, a different shape, or a different shading. By rendering each individual gas molecule image in the display and animating such molecule image in portions of the pneumatic system, the presence and concentration of gas in that portion of the pneumatic system can be simulated. Additionally, the animation logic script for each gas molecule image can include logic for hiding the respective gas molecule images from display in the pneumatic system so as to simulate the absence of gas in that portion of the pneumatic system.

Notably, each of the user interface, machine display, animation logic, flow model and lung compliance and resistance model can be disposed in a network distributable animation package configured for interpretation and presentation by an animation plug-in to a content browser. In this regard, the invention can be deployed across intranets and internets alike, including the global Internet. To facilitate such distribution, the ventilation animation logic can implement semi-quantitative methods in order to illustrate directional gas flows and gas flow rates in the pneumatic system. Specifically, the anesthesia machine animation logic can include logic for controlling animation sections depicting gas molecules in the pneumatic system based upon the gas flow data received from the flow model.

A method for interactively simulating a pneumatic system can include rendering an iconic representation of the pneumatic system. Individual ones of a multiplicity of gas molecule images for display in the pneumatic system can be coupled to corresponding animation logic scripts. Specifically, each of the scripts can govern an animation direction and display rate for animating corresponding ones of the gas molecule images in the pneumatic system. Gas flow data can be determined based upon computed pressures in the pneumatic system. Consequently, animation direction and display rates for selected ones of the gas molecule images can be changed based upon the determined gas flow data.

Preferably, logic code for performing the rendering, computing and re-rendering steps can be stored in a server-side content distribution system. Subsequently, the stored logic code can be distributed over a computer communications network to a client-side content browser. Consequently, the rendering, computing and re-rendering steps can be performed in the client-side content browser. In this way, the simulation method can be centrally defined and distributed, but remotely performed within conventional browser clients, regardless of the computing resources supporting the conventional browser clients.

In a preferred aspect of the invention, an iconic representation of an instrument interface for controlling the pneumatic system can be rendered in a separate display. Subsequently, an end-user can toggle between a display of the iconic representation of the pneumatic system and the iconic representation of the instrument interface. Also, in the preferred aspect of the invention, the rendering step can include displaying gas molecules representative of different gases in the pneumatic system. Each gas molecule can have at least one distinguishing visual characteristic associated with a specific type of gas. Importantly, the displayed gas molecules can be hidden from view to simulate an invisible mode of operation of the pneumatic ventilation. Finally, the rendering step can include the step of displaying a digital photograph of an element of the pneumatic system which corresponds to a selected element in the iconic representation.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE INVENTION

Figure 1:
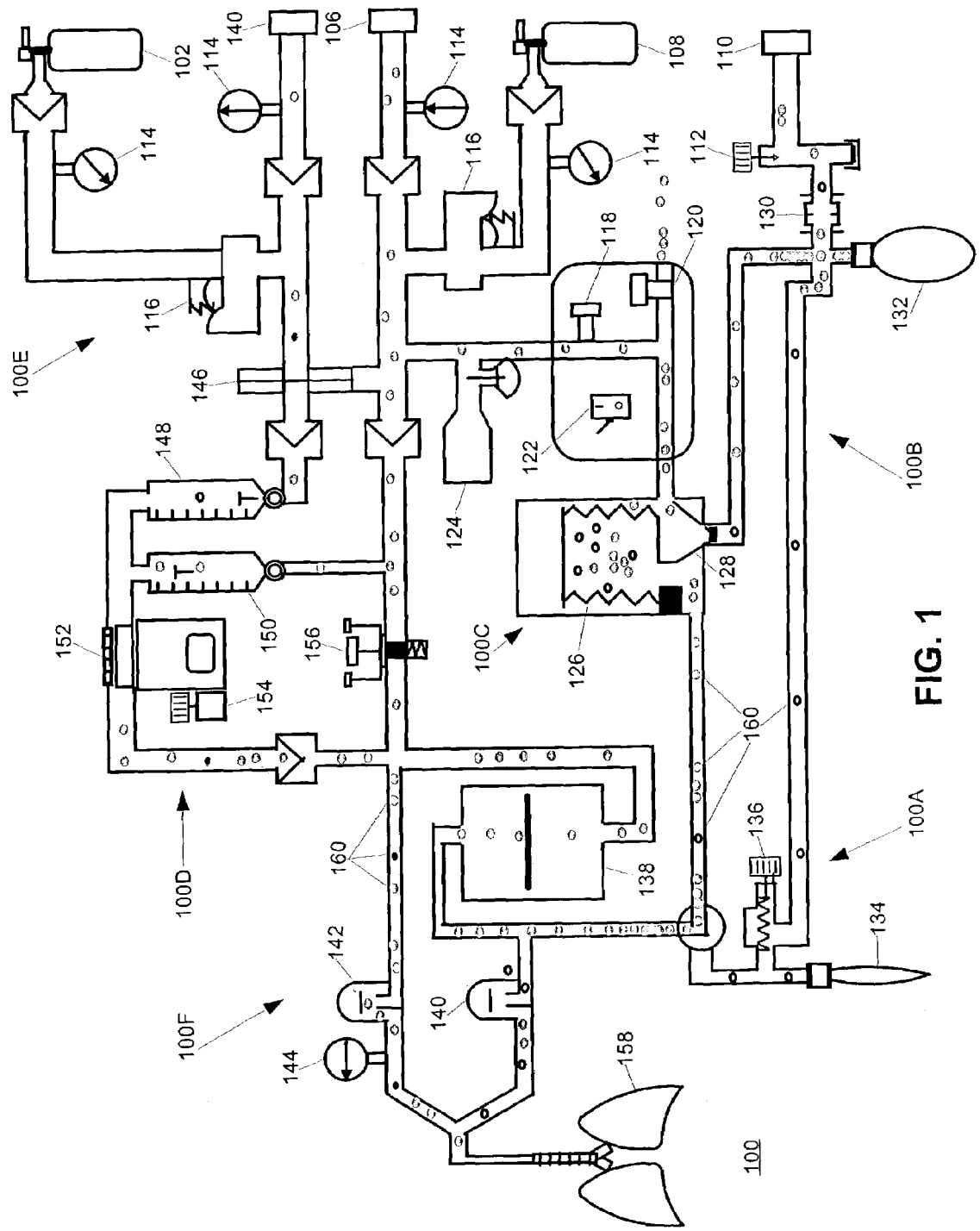
FIG. 1 is a schematic illustration of an exemplary iconic representation of a pneumatic system for use in the simulator of the present invention.

The present invention is a pneumatic simulation system, method and apparatus. In accordance with the present invention, a conceptual view of a pneumatic system can be rendered in a graphical user interface. The pneumatic system can include, as an example, an, anesthesia machine, though the invention is not so limited and other systems can suffice, for instance an ICU ventilator. In any event, elements of the conceptual view of the pneumatic system can be activated, deactivated, or otherwise manipulated through the user interface. Resulting gas flows within the pneumatic system can be simulated graphically in the conceptual view.

More particularly, iconic representations of the gases in the pneumatic system can be animated through the concurrent presentation of individual gas molecule images within conduit sections of the pneumatic system. Each gas molecule image can be animated by way of a corresponding animation script. Each animation script can determine a direction and rate of animation for a corresponding gas molecule in a specific conduit. The animation script can govern the animated movement of the gas molecule image from the beginning of the specific conduit to the end. The animation script further can identify a next conduit in which the gas molecule image is to be rendered and animated once the gas molecule image encounters the end of the specific conduit.

Importantly, in specific reference to an anesthesia machine implementation, the rate and direction of animation for each gas molecule image can be resolved by reference to a truth table in which such rate and direction can be determined from the state of the controls of the anesthesia machine and contemporary pressure data computed for the pneumatic system. The contemporary pressure data, in turn, can be computed from volumetric data processed by a lung compliance and resistance model. As a result, the real-time generated animations, when combined with the flow model, can result in a computational simulation of the operation of the pneumatic system.

Importantly, the graphical user interface need not become consumed both by the rendering of the simulated pneumatic system and an associated control panel interface through which the simulated pneumatic system can be operated. Rather, each of the rendered pneumatic system and the control panel can be disposed in separate views, each of the separate views having a toggle element. In this way, an end user can toggle back and forth between the separate views merely by activating the toggle element within the presently displayed view.

Within the conceptual view, selected iconic elements can be color coded in accordance with nationally and internationally recognized standards for color coding gases. Additionally, representative simulated gas molecules within the plumbing of the conceptual view further can be color coded. Consequently, a best estimate of gas mixtures and concentrations within a segment of the conceptual view can be ascertained by simple reference to the number and color of simulated gas molecules in the segment under study. Similar to the color coding of iconic elements, the legends of the simulation can be localized. In this regard, the localized legends of the simulation display can be implemented as an overlay over the simulation. In this way, a multitude of language compatibilities can be achieved simply by swapping overlays at run-time. When combined with the regionalized coloring of the gases, the end user can configure the simulation to the regional characteristics of the end user. For example, Brazilians speak Portuguese, though Brazilians utilized American color codes. In Portugal, however, Portuguese is the spoken language and ISO color codes are utilized.

FIG. 1 is a schematic illustration of an exemplary iconic representation of a pneumatic system 100 for use in the simulator of the present invention. One skilled in the art will recognize that the pneumatic system 100 illustrated in FIG. 1 is an anesthesia machine, though as noted above, the invention can include other pneumatic system types, for instance an ICU ventilator or a mechanical ventilator. Referring to FIG. 1, the pneumatic system 100 can include a compilation of individual iconic representations associated with specific components in the pneumatic system. Sets of the individual iconic representations can be grouped so that the pneumatic system can be logically partitioned into six logical groupings: a manual ventilation system 100A, a scavenging system 100B, a mechanical ventilation system 100C, a low pressure gas distribution system 100D, a high pressure gas distribution system 100E, and a breathing circuit 100F.

The high pressure gas distribution system 100E can receive selected gases from gas supply sources including fixed supply lines 106, 140 and gas tanks 102, 108. In a conventional anesthesia arrangement, for instance, both oxygen and nitrous oxide can be provided. Pressure gauges 114 can monitor pressure readings in the plumbing through which each of the gasses passes in the high pressure gas distribution system 100E. Pressure regulators 116 can regulate the pressure of gas flowing through the high pressure gas distribution system 100E. Moreover, a gas failsafe switch 146 can ensure that in the absence of pressure from the gas sourced from the fixed oxygen supply line 106 and the oxygen gas tank 108, nitrous oxide flow from gas source 140 and 102 is interrupted. Also, a low gas supply pressure alarm 124 further can alert the end user to a low gas flow condition stemming from the fixed supply line 106 and the gas tank 108. In any case, subject to the operation of the gas failsafe switch 146, gases such as oxygen and nitrous oxide can flow from the gas supply sources through check valves into the low pressure gas distribution system.

The low pressure gas distribution system 100D can receive pressure regulated gasses from the high pressure gas distribution system 100E. Flow meters 148 can monitor the flow of the individual gases into the low pressure gas distribution system 100D. Moreover, the rate of flow of each gas can be tuned using flow meter knobs affixed to the flow meters 148. A vaporizer 152 can ensure a particular volatile anesthetic content for the mixed gasses exiting from the vaporizer 152. Subsequently, the mixed gases can be passed through a check valve into the breathing circuit 100F. Importantly, a gas flush valve 156 can be provided such that the activation of the flush valve can introduce dramatic flows of gas sourced from the gas supply line 106 and gas tank 108.

The breathing circuit 100F can process gas flows as the gas mixture provided by the low pressure gas distribution system 100D both during an inhalation cycle in which gases are inhaled into lungs 158, and also during an exhalation cycle in which gases are exhaled from the lungs 158. One way valves 140, 142 can be provided to direct gas flow during the inhalation/exhalation cycles. During the inhalation cycle, inspiratory valve 142 can open while the expiratory valve can remain closed. Conversely, during the exhalation cycle, expiratory valve 140 can open while the inspiratory valve 142 can remain closed. Of course, a pressure gauge 144 can provide visual feedback for monitoring the gas pressure in the plumbing leading from the inspiratory valve 142 into the lungs 158. Finally, a carbon dioxide absorber can be provided for removing carbon dioxide from exhaled gases prior to their reintroduction into the plumbing leading to the inspiratory valve 142.

Notably, the virtual gauges 114, 144, 148, 150, 152 of the pneumatic system 100 can zoomably activated by operation of a selection device such as a mouse pointer. In this regard, each individual virtual gauge 114, 144, 148, 150, 152 can be enlarged when selected so that each individual virtual gauge 114, 144, 148, 150, 152 can be read with ease. Similarly, individual operable switches and buttons 112, 122, 124, 136, 154, 156 can be zoomably activated so that each operable switch and button 112, 122, 124, 136, 154, 156 can be manipulated by an end user with ease. Yet, while in a normal mode, the details of each operable switch and button 112, 122, 124, 136, 154, 156 can be obscured so as to not consume the display of the pneumatic system.

Referring again to FIG. 1, the breathing cycle of inhalation and exhalation can be induced either manually, spontaneously, or automatically. In this regard, a mechanical ventilation system 100C can drive the automatic inducement of the breathing cycle. The mechanical ventilation system 100C can include an activation switch 122 which, responsive to user selection, can activate and deactivate the mechanical ventilation system 100C. A ventilator proportional flow control valve 118 can control a proportion of bellows drive gas flow from the high pressure system 100E. Similarly, a ventilator exhalation valve 120 can permit the release of bellows drive gas from the pneumatic ventilator 126 into the surrounding atmosphere.

Central to the mechanical ventilation system 100C, a bellows 126 or piston can drive the flow of gas from the breathing circuit 100F through the mechanical ventilation system 100C through a pumping action. A pressure relief valve 128 can be coupled to the bellows 126 to facilitate the expulsion of exhaled gases from mechanical ventilation system 100C into the scavenging system 100B in which excess gases can be removed from the pneumatic ventilator 100 via vacuum line 110. In this regard, the scavenging system 100B can include each of a scavenging bag 132, both positive and negative pressure relief valves 130, and an adjustment valve 112. Each can operate in concert in order to assure the proper disposal of excess gases through the vacuum line 110.

Finally, the manual ventilation system 100A can provide for the manual driving of the inhalation and exhalation cycles in the breathing circuit through the manual operation of a breathing bag 134. More specifically, a selector switch can divert the flow of gas provided by the breathing circuit 100F from the mechanical ventilation system 100C into the manual ventilation system 100A. The continual squeezing of the breathing bag 134 can drive the flow of gas from the breathing circuit 100F through the manual ventilation system 100A in the same manner as the bellows 126 of the mechanical ventilation system 100C. Notably, an adjustment valve further can be provided to regulate the flow of gases into the scavenging system 100B. Still, the manual ventilation system 100A differs in some respect from the mechanical ventilation system 100C. For instance, in manual ventilation, excess gas is spilled during inspiration, as opposed to end expiration for mechanical ventilation.

During spontaneous ventilation, the patient initiates the flow of gas into the lungs by generating a sub-ambient pressure during inspiration. Spontaneous inspiration is independent of the position of the manual/ventilator selector knob. When the selector knob is set to manual, the APL valve can be forced closed during inspiration. When the selector knob is in ventilator mode, the bellows can be forced downwards during inspiration. When the selector knob is set to ventilator mode and the ventilator has been switched on, the ventilator will interfere with the spontaneous breathing of the patient. Thus, to produce a realistic simulation, the interaction between spontaneous breathing and the ventilator has been modeled and simulated, including the effects on airway pressure and bellows volume.

Significantly, the flow of gases within the pneumatic system 100 can be simulated based upon various valve and switch settings applied by the end user. In particular, iconic representations of the gas molecules 160 in the system can be provided to indicate not only the presence of gas in any particular portion of the pneumatic system 100, but also the relative concentration of the gas species in any particular portion of the pneumatic system. In this regard, the relative number of gas molecules illustrated in a portion of the pneumatic system can be proportional to the concentration of gas in that portion. Moreover, different types of gases can be represented within the pneumatic system 100 by different colors, shadings, shapes or other visibly discernible characteristics of the iconic representations of the gas molecules 160. In any case, the gas molecules 160 can be rendered "invisible" where no visual indication of gas is desired.

Importantly, the flow rate and flow direction of gases in the pneumatic system 100 can be simulated by the rendering and animation of representative gas molecule images 160 in the conduit sections of the pneumatic system, for instance within a straight section of plumbing. Animation of imagery is a well-known technique most commonly embodied in the Director™ and Shockwave™ technology set manufactured by Macromedia Corporation of San Francisco, Calif. Specifically, using Director technology, individual images of gas molecule images 160 can be rendered in a visual display using programmatic logic in the form of a script comprising machine-readable code. The script can process flow rate data to determine a direction of animation for the gas molecule image 160, in addition to an animation rate, in terms of speed of animation. When the gas molecule image 160 encounters a boundary edge of the conduit, the script with reference to the truth table can identify a suitable new conduit in which the gas molecule 160 can be animated. At that juncture, the gas molecule image 160 can be rendered in the identified conduit. Notably, the truth table can specify animation gas flow data based upon provided gas volumes and pressures.

Figure 2:
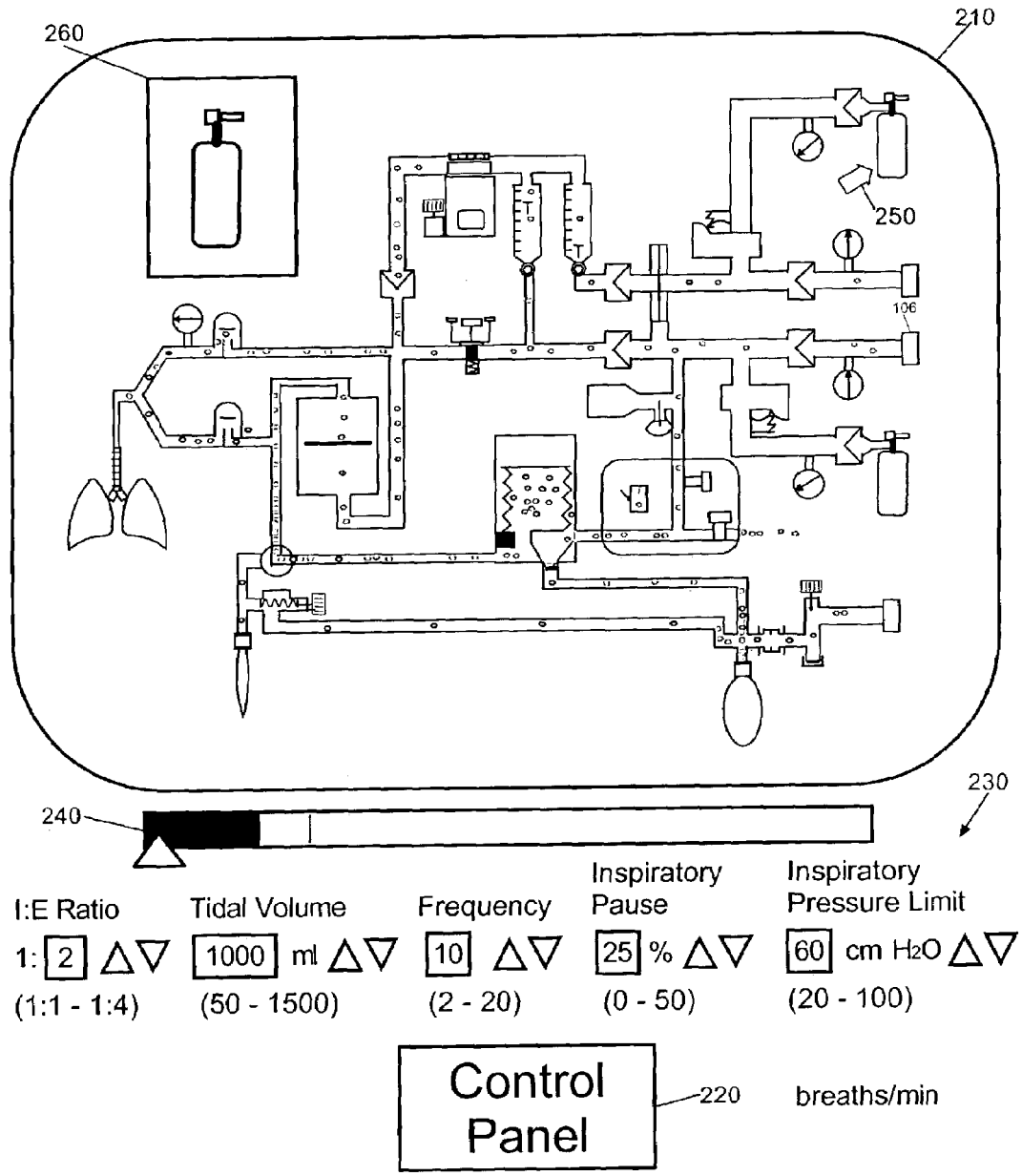
FIG. 2 is a pictorial illustration of a pneumatic system display incorporating the exemplary iconic representation of FIG. 1.

Importantly, the pneumatic system 100 of FIG. 1 can be disposed in a graphical user interface through which end users can interact with the operable portions thereof while observing the effects of their interactions on gas flow in the pneumatic system 100. To that end, FIG. 2 is a pictorial illustration of a simulator display incorporating the exemplary iconic representation of FIG. 1. The graphical user interface principally can include an iconic representation 210 of the pneumatic system, a machine settings panel 230, a breathing cycle slider 240, and a toggle element 220. The machine settings panel 230 can provide a user interface through which an end user can establish the basic parameters of operation for the iconic representation 210. In the case of an anesthesia machine, the breathing cycle slider 240 can provide a visual indication of the progress of the breathing cycle by automated movement from one color coded region to the next. This representation may also be applicable to an actual user interface in an actual ventilator.

Notably, a photographic presentation region 260 can be established in which actual digital imagery of an element of the iconic representation 210 can be displayed when an end user passes a pointing element 250 in proximity to or atop the element. In this way, the end user can establish a mental association between an actual component of a pneumatic system and its corresponding representation in the iconic representation 210 of the pneumatic system. Finally, the toggle element 220 can provide a quick mechanism for causing the toggled display of a control panel for operating the iconic representation 210. In this way, both the control panel and the iconic representation 210 need not be concurrently displayed in the same crowded graphical display.

Figure 3:
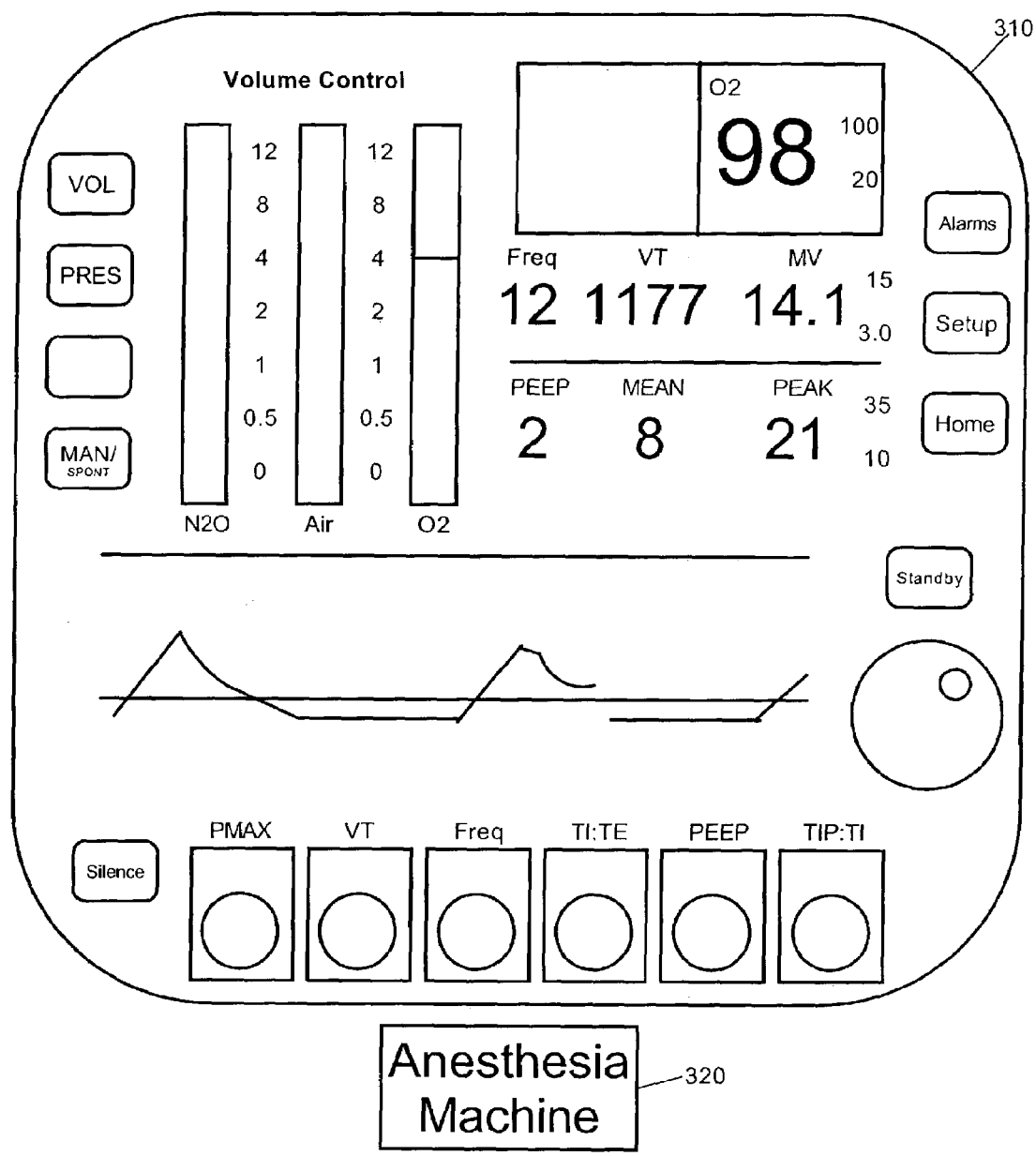
FIG. 3 is a pictorial illustration of a user interface configured to accept user interaction for establishing operational settings and parameters for the pneumatic system display of FIG. 2; and, FIGS. 4 and 4a–c are, respectively, a block diagram illustrating the system and method for interactively simulating a pneumatic system, a block diagram of an exploded view of a visual display provided by the system of FIG. 4 wherein visual images of simulated gas molecules move in a prescribed direction at a prescribed rate, a block diagram of the exploded view of the display wherein the visual images of gas molecules change direction and rate in the visual display, and wherein the system is distributed over a data communications network.

In further illustration of the toggled display of the iconic representation 210 and a control panel, FIG. 3 depicts a control panel 310 configured to accept user interaction for establishing operational settings and parameters for the iconic representation 210 of the pneumatic system of FIG. 2. The control panel 310 can include visual feedback elements including flow meters and digital gauges for indicating the flow rate of gases within the pneumatic system, breathing rates, and pressure and volume measurements in a format that may replicate GUIs on existing machines. The control panel 310 further can include a visual charting of the breathing cycle and can provide audible feedback in addition to visual feedback. Importantly, as in the case of the iconic representation 210 of FIG. 2, the toggle element 320 of FIG. 3 can be disposed in or in association with the control panel 310 so as to provide a quick mechanism for causing the toggled display of the iconic representation 210 of the pneumatic system as shown in FIG. 2.

Figure 4:
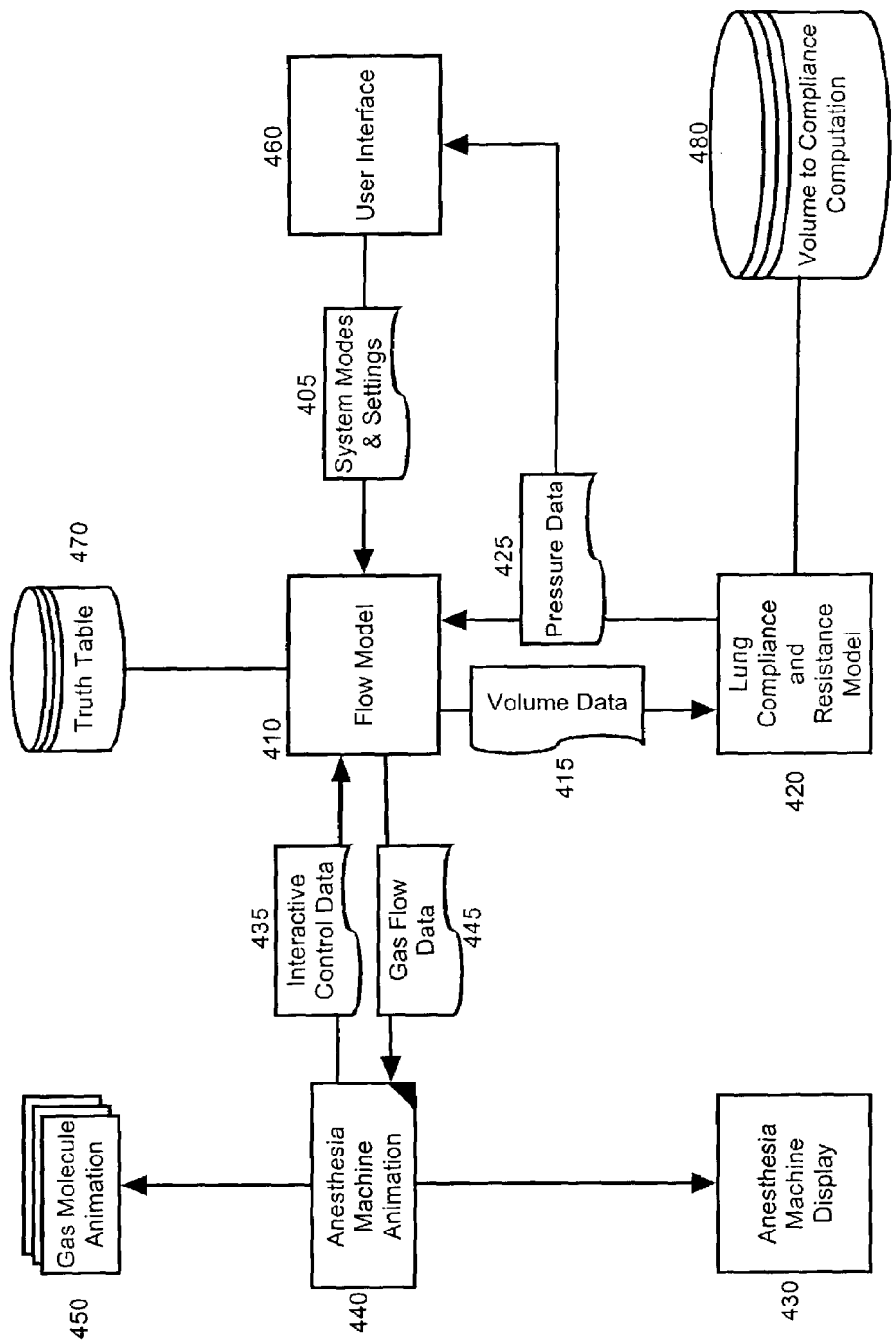

Importantly, in accordance with the present invention the direction and nature of gas flow within the pneumatic system can be simulated through the application of a semi-quantitative flow model. In the semi-quantitative flow, the direction and animation rate of individual gas molecule images can be determined in reference to a truth table in which pneumatic system valve and flow rate settings and pressure data can be correlate to gas flow data necessary to properly animate each gas molecule image. Moreover, to accommodate the inherent limitations of a graphical computerized display, the gas flow data, particularly the animation speed, can be scaled to within acceptable ranges which can be accommodated by the graphical user interface of the present invention. In further illustration of the animation of the gas molecule images in the pneumatic system of the present invention, FIG. 4 depicts a system and method for interactively simulating a pneumatic system.

The system of the invention can include at its core a flow model 410. The flow model 410 can be implemented in machine-readable code and coupled to, or otherwise linked with each of simulated anesthesia machine animation package 440 of computer-readable code, a user interface 460, a lung compliance and resistance model 420, and a truth table 470 specifying gas flow paths though the anesthesia machine display. The flow model object 410 can generate gas flow data 445 and gas volume data 415 by modeling gas flow based on interactive control data 435 received from the anesthesia machine animation package 440, pressure data 425 received from the lung compliance and resistance model object 420, and ventilation modes and settings 405 received through the user interface 460. Specifically, the flow model 410 can correlate the pressure data 425 and ventilation modes and settings 405 with specific gas flow data within the truth table 470 for gas flow paths. In this way, a semi-quantitative analysis can produce the required gas flow data 445.

Notably, the flow model 410 can ensure that the simulation of the pneumatic system is responsive to a multitude of user settings and machine controls. In contrast to the flow model 410, the lung compliance and resistance model object 420 can process the volume data 415 to simulate the operation of a patient's lungs. More particularly, the lung compliance and resistance model object 420 can generate pressure data 425 for use by the flow model 410 by modeling lung pressure based upon the received volume data, the interactive control data 435, as well as the volume of gas previously present in the patient's lungs. A volume to pressure computation 480 can be performed based on the lung compliance and resistance model 420 in furtherance of this purpose.

In addition, to providing pressure data 425 to the flow model 410, the lung compliance and resistance model 420 can provide pressure data 425 to the user interface 460 for display in the user interface 460. The user interface 460 can include a control panel which interactively simulates an anesthesia workstation. Using the control panel of the user interface 460, an end user can alternately control the simulation and view the simulation. Specifically, the end user can toggle between a view of the pneumatic system and the control panel in order to control and monitor the simulation. In this regard, control information can be passed to the flow model 410 in the form of the ventilation modes and settings 405.

Significantly, the anesthesia machine animation logic scripts 440 of machine-readable code can pass gas flow data 445 to the gas molecule animation logic scripts 450, which are coupled, or otherwise linked, to machine-implemented code corresponding gas molecule imagery (not shown) and configured for visually rendering in the graphical user interface the simulated display of the anesthesia machine 430. Using the gas flow data 445, the gas molecule animation scripts 450 can determine a direction and speed of animation for the corresponding gas molecule imagery in order to simulate a concentration of gas and the direction of flow of gas in the pneumatic system. Moreover, the gas molecule animation scripts 450 can determine in which conduit to render the imagery as individual gas molecule images reach the graphical and logical boundary of a conduit in the visual display of the simulated anesthesia machine 430. Finally, depending upon whether any gas flows at all through the conduit, the gas molecule animation scripts 450 can remove a gas molecule image from visual display in the conduit so as to simulate a lack of gas in the conduit. Moreover, as noted above, the various animation scripts can be configured in packages of network-distributable code. Accordingly, the described packages of machine-readable code can be readily conveyed over a data communications network, as will be readily understood by one of ordinary skill.

Figure 4A:
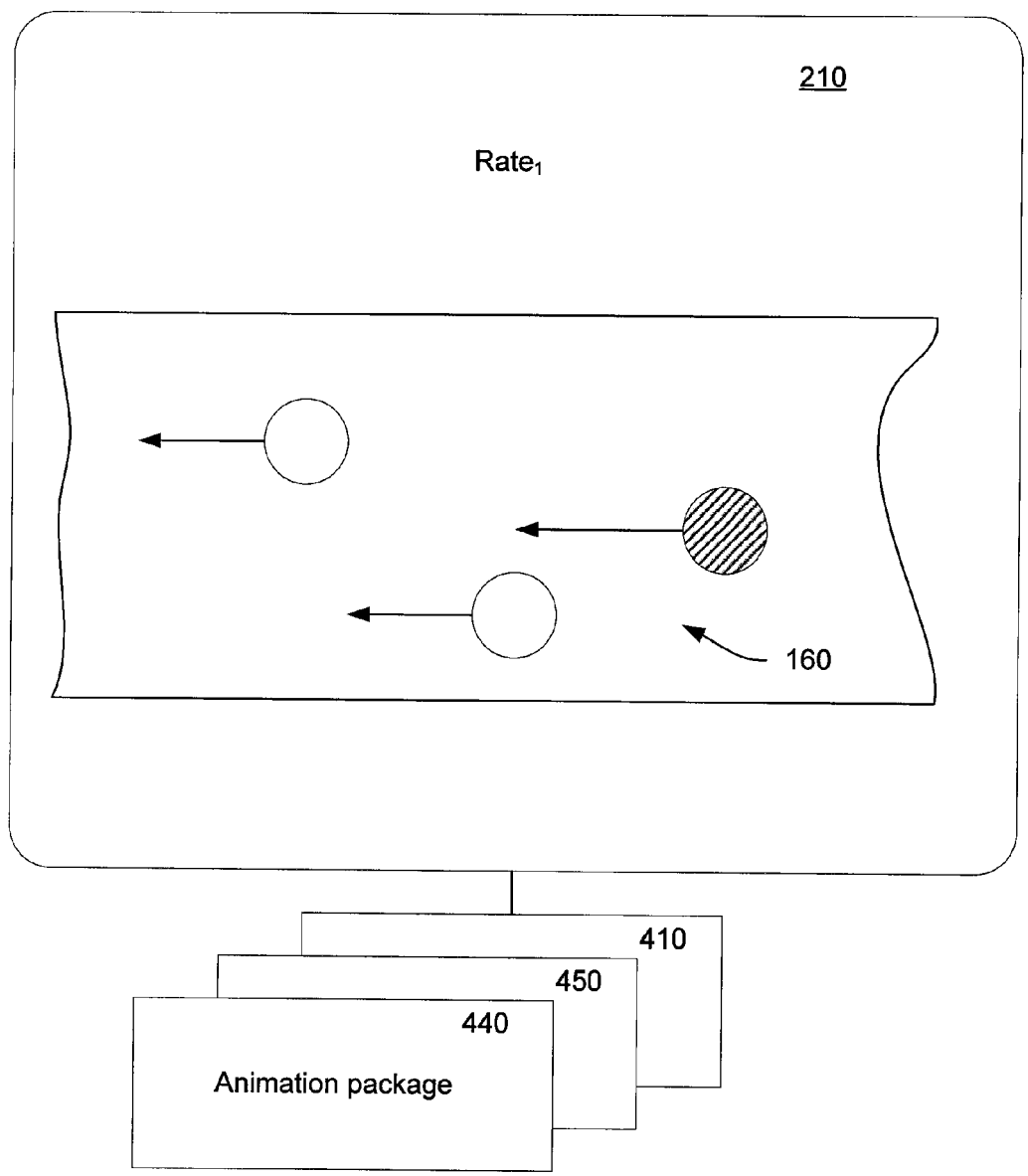

FIG. 4a schematically illustrates an exploded view of a portion of the visual display, or iconic representation 210, of a simulated pneumatic system, the exploded view providing a closer view of the visual images of simulated gas molecule 160 moving within one of the conduits of the system. Arrows indicate the movement of the visual images of the simulated gas molecules 160 corresponding to the flow direction of gas molecules in the simulated pneumatic system. A rate of flow is indicated as $Rate_1$ in the visual display 210. As illustrated, the images of the gas molecules are rendered as distinct images by cross-hatching to indicate different images that correspond to different chemical entities.

Figure 4B:
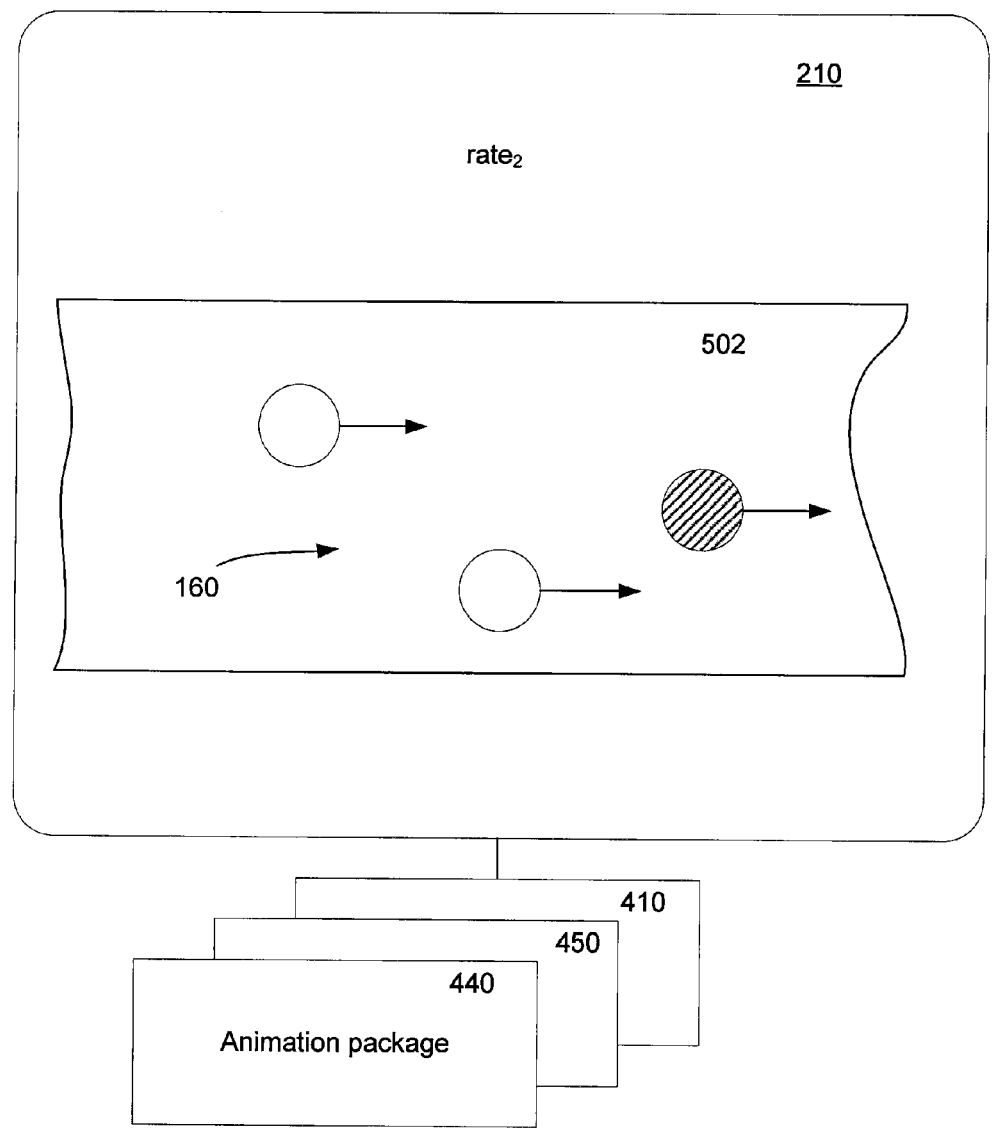

FIG. 4b schematically illustrates another exploded view of a portion of the visual display, or iconic representation 210, of a simulated pneumatic system. As shown, the direction of movement of the images of simulated gas molecules 160 in the visual display 210 has changed, as has the rate, which is now $Rate_2$.

Figure 4C:
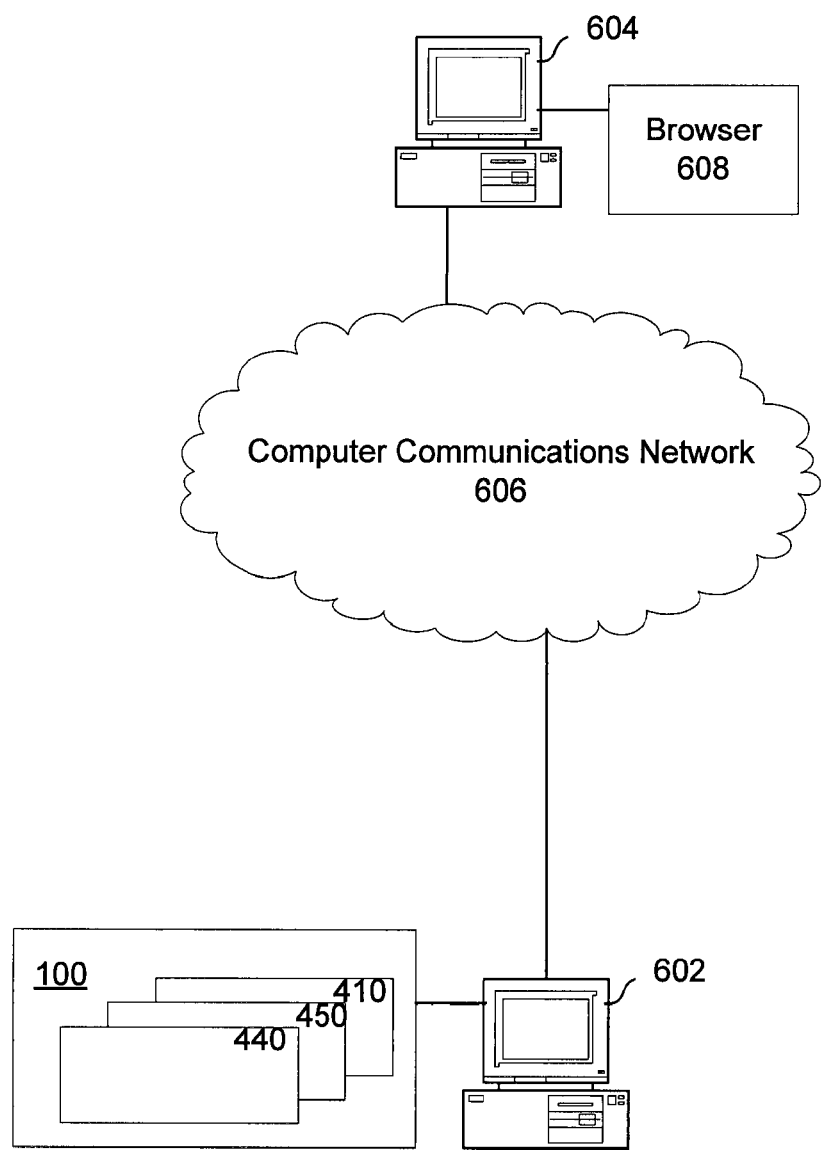

FIG. 4c schematically illustrates a communications network environment 600. Within the exemplary environment 600, the user interface, the machine display 210, machine-readable code in the form of animation logic scripts 430, 440, 450, the flow model 410, and the lung compliance and resistance model 420 are distributed in network-distributable animation packages between nodes 602, 604 linked to a computer communications network 606, as described above. Accordingly, the simulation can be configured for interpretation and presentation by an animation plug-in to a content browser 608, as described above and explicitly illustrated in the figure. In this manner, the invention can be deployed across intranets and internets alike, including the global Internet.

It will be recognized by the skilled artisan that the advantages of the present invention are numerous. One significant advantage of the invention is that the simulated pneumatic system facilitates the education of an end user in learning how to operate a medical device in an efficient, interactive manner. Moreover, as the logic of the invention can be distributed about a computer communications network and presented through conventional content browsing technology, the end user can more efficiently and effectively train to use the medical device, at any time and at any location, than conventionally possible. Other aspects and advantages of the invention will become apparent from the following detailed description taken in conjunction with the accompanying drawings, illustrating, by way of example, the principles of the invention.

Importantly, the method and system of the present invention can be realized in hardware, software, or a combination of hardware and software. An implementation of the method of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. An interactive simulator configured to simulate a pneumatic system, the simulator comprising:

a user interface configured for establishing ventilation modes and settings for a simulated pneumatic system;

a visual display communicatively linked to said user interface and configured to present a dynamically determined animated illustration of the simulated pneumatic system;

a plurality of gas molecule animation logic scripts for animating images of simulated gas molecules on said visual display, each of said gas molecule animation logic scripts causing said images of simulated gas molecules to move in a prescribed direction and at a prescribed speed within a portion of said simulated pneumatic system on said visual display; and, a flow model communicatively linked to said gas molecule animation logic scripts and to a lung compliance and resistance model, said lung compliance and resistance model providing gas pressure data to said flow model and to said user interface responsive to gas volume data produced in said flow model, said flow model dynamically producing said gas flow data for use with said gas molecule animation logic scripts responsive to said gas pressure data provided by said lung compliance and resistance model, and user-activated ventilation modes and settings provided through said user interface for simulating ventilation modes and settings with respect to the simulated pneumatic system.

2. The interactive simulator of claim 1, wherein each of said user interface and visual display of the simulated pneumatic system are disposed in separate views in which only one of separate views is displayed at any one time, and further wherein each of said user interface and said visual display of the simulated pneumatic system comprises a toggle element which when activated can toggle a display of each said separate view.

3. The interactive simulator of claim 1, wherein said images of simulated gas molecules comprise a selection of different gas icons representative of gas present in portions of the visual display of the simulated pneumatic system, each of said different gas icons which represent a different type of gas having a distinguishing characteristic selected from the group consisting of a different color, a different shape and a different shading.

4. The interactive simulator of claim 3, wherein each of said gas molecule animation logic scripts is further configured to obscure from view on the visual display said different gas icons so as to simulate a lack of gas in a portion of said simulated pneumatic system.

5. The interactive simulator of claim 1, further comprising a gas flow truth table and further configured to perform a volume to pressure computation, said gas flow truth table correlating pressure values received from said lung compliance and resistance model with gas flow values, said volume to pressure computation correlating volume values received from said flow model with said pressure values.

6. The interactive simulator of claim 1, wherein each of said user interface, visual display of the simulated pneumatic system, gas molecule animation logic scripts, flow model and lung compliance and resistance model is disposed in a network distributable animation package configured for interpretation and presentation by an animation plug-in to a content browser.

7. The interactive simulator of claim 1, further comprising a set of photographic images of iconic elements of the pneumatic system presented in said visual display of the simulated pneumatic system, wherein individual ones of said set of photographic images can be selected and displayed in said visual display responsive to a selection of a corresponding one of said iconic elements.

8. The interactive simulator of claim 1, wherein said visual display of the simulated pneumatic system comprises a collection of iconic elements representative of an anesthesia machine, said iconic elements simulating a breathing circuit, a low pressure gas distribution system, a high pressure gas distribution system, a mechanical ventilator and a scavenging system.

9. The interactive simulator of claim 8, wherein said logical groupings further comprises a manual ventilator having an activatable iconic representation of a breathing bag which when activated though said display of the anesthesia machine can simulate a physical squeezing of said breathing bag.

10. The interactive simulator of claim 8, wherein said interactive simulator presents an exploded view of a selected portion of the simulated pneumatic system.

11. The interactive simulator of claim 8, wherein individual ones of said iconic elements are configured for activatable zooming.

12. The interactive simulator of claim 1, wherein said visual display of the simulated pneumatic system further comprises a visual slider bar having a plurality of distinctive segments to indicate different time phases of a breath cycle presented concurrently in said simulated pneumatic system.

13. The interactive simulator of claim 1, wherein said simulator computes both a maximum and minimum flow rate and scales computed flow rates of said simulated gas molecules to fall between said maximum and minimum flow rate.

14. The interactive simulator of claim 13, wherein said scaled computed flow rates correspond to flow rates which are displayable in said pneumatic machine display.

15. A method for interactively simulating a pneumatic system comprising the steps of:

visually rendering on a graphical display an iconic representation of the pneumatic system;

visually rendering individual ones of a plurality of gas molecule images for display in the representation of the pneumatic system using gas molecule animation logic scripts responsive to gas pressure data provided by a lung compliance and resistance model, each of said scripts governing an animation of the gas molecule images by causing the gas molecule images to move in a prescribed direction and at a prescribed display rate in the representation of the pneumatic system;

determining gas flow data based upon simulated pressures in the pneumatic system; and, changing animation direction and display rates for selected ones of said gas molecule images based upon said determined gas flow data.

16. The method of claim 15, further comprising the steps of:

storing logic code for performing said rendering, determining and changing steps in a server-side content distribution system;

distributing said stored logic code over a computer communications network to a client-side content browser; and, performing said rendering, determining and changing steps in said client-side content browser.

17. The method of claim 15, further comprising the steps of:

visually rendering in a separate graphical display an iconic representation of an instrument interface for controlling simulated operation of the pneumatic system; and, toggling between a display of said iconic representation of the pneumatic system and said iconic representation of said instrument interface.

18. The method of claim 15, wherein said visually rendering step further comprises the step of displaying iconic representations of gas molecules representing different gases in the pneumatic system, each iconic representation of a gas molecule having at least one distinguishing visual characteristic associated with a specific type of gas.

19. The method of claim 18, further comprising removing said displayed gas molecules from view to simulate an invisible-gas mode of operation of the pneumatic ventilation.

20. The method of claim 15, wherein said rendering step further comprises the step of displaying a digital photograph of an element of said pneumatic system which corresponds to a selected element in said iconic representation.

21. The method of claim 15, wherein said computing step comprises the steps of:
  consulting at least one truth table to establish said gas flow data based upon simulated volume based pressure data, simulated ventilation mode data and user established simulated pneumatic system settings; and,
  determining animation direction and display rates for selected ones of said gas molecule images based upon said determined gas flow data in said at least one truth table.

22. The method of claim 15, wherein said rendering step further comprises visually rendering at least one iconic representation gas tank with a specific color code corresponding to at least one user-specified convention selected from the group consisting of a regional convention, national convention, and language.

23. The method of claim 15, wherein said rendering step further comprises rendering at least one visually displayed legend having text in a locally-recognized language.

24. A machine readable storage having stored thereon a computer program for interactively simulating a pneumatic system, the computer program comprising a routine set of instructions for causing the machine to perform the steps of:
  visually rendering on a graphical display an iconic representation of the pneumatic system;
  visually rendering individual ones of a plurality of gas molecule images for display in the representation of the pneumatic system using gas molecule animation logic scripts responsive to gas pressure data provided by a lung compliance and resistance model, each of said scripts governing an animation of the gas molecule images by causing the gas molecule images to move in a prescribed direction and at a prescribed display rate in the representation of the pneumatic system;
  determining gas flow data based upon simulated pressures in the pneumatic system; and,
  changing animation direction and display rates for selected ones of said gas molecule images based upon said determined gas flow data.

25. The method of claim 24, further comprising the steps of:
  storing logic code for performing said rendering, determining and changing steps in a server-side content distribution system;
  distributing said stored logic code over a computer communications network to a client-side content browser; and,
  performing said rendering, determining and changing steps in said client-side content browser.

26. The method of claim 24, further comprising the steps of:
  visually rendering in a separate graphical display an iconic representation of an instrument interface for controlling simulated operation of the pneumatic system; and,
  toggling between a display of said iconic representation of the pneumatic system and said iconic representation of said instrument interface.

27. The method of claim 24, wherein said visually rendering step further comprises the step of displaying iconic representations of gas molecules representing different gases in the pneumatic system, each iconic representation of gas molecule having at least one distinguishing visual characteristic associated with a specific type of gas.

28. The method of claim 27, further comprising removing said displayed gas molecules from view to simulate an invisible-gas mode of operation of the pneumatic ventilation.

29. The method of claim 24, wherein said rendering step further comprises the step of displaying a digital photograph of an element of said pneumatic system which corresponds to a selected element in said iconic representation.

30. The method of claim 24, wherein said computing step comprises the steps of:
  consulting at least one truth table to establish said gas flow data based upon simulated volume based pressure data, simulated ventilation mode data and user established simulated pneumatic system settings; and,
  determining animation direction and display rates for selected ones of said gas molecule images based upon said determined gas flow data in said at least one truth table.

31. The method of claim 24, wherein said rendering step further comprises visually rendering at least one iconic representation gas tank with a specific color code corresponding to at least one user-specified convention selected from the group consisting of a regional convention, national convention, and language.

32. The method of claim 24, wherein said rendering step further comprises rendering at least one legend having a localized language.

33. A method of interactively simulating a pneumatic system comprising the steps of:
  dividing the pneumatic system into logical component sections for presenting an interactive simulation of the pneumatic system;
  visually rendering said logical component sections in a graphical user interface;
  permitting user modification of control element settings in said logical component sections; and,
  animating visual images of simulated gas flows within said logical component sections using individually rendered gas molecule icons coupled to corresponding animation scripts responsive to gas pressure data provided by a lung compliance and resistance model, each of said scripts determining an animation direction and animation rate for a corresponding one of said gas molecule icons.

* * * * *